(12) United States Patent
Martin et al.

(10) Patent No.: US 11,483,720 B2
(45) Date of Patent: *Oct. 25, 2022

(54) COMMUNICATIONS DEVICE AND METHOD

(71) Applicant: Sony Corporation, Tokyo (JP)

(72) Inventors: Brian Alexander Martin, Basingstoke (GB); Martin Warwick Beale, Basingstoke (GB); Shin Horng Wong, Basingstoke (GB); Yuxin Wei, Basingstoke (GB); Samuel Asangbeng Atungsiri, Basingstoke (GB); Vivek Sharma, Basingstoke (GB); Hideji Wakabayashi, Basingstoke (GB); Shinichiro Tsuda, Basingstoke (GB); Chrysovalantis Kosta, Basingstoke (GB)

(73) Assignee: SONY CORPORATION, Tokyo (JP)

( * ) Notice: Subject to any disclaimer, the term of this patent is extended or adjusted under 35 U.S.C. 154(b) by 24 days.

This patent is subject to a terminal disclaimer.

(21) Appl. No.: 17/101,760

(22) Filed: Nov. 23, 2020

(65) Prior Publication Data

US 2021/0076227 A1 Mar. 11, 2021

Related U.S. Application Data

(63) Continuation of application No. 16/346,134, filed as application No. PCT/EP2017/076260 on Oct. 13, 2017, now Pat. No. 10,848,983.

(30) Foreign Application Priority Data

Nov. 4, 2016 (EP) ..................................... 16197339

(51) Int. Cl.
*H04W 48/20* (2009.01)
*H04W 16/28* (2009.01)
(Continued)

(52) U.S. Cl.
CPC .......... *H04W 16/28* (2013.01); *H04B 7/0408* (2013.01); *H04B 7/0486* (2013.01);
(Continued)

(58) Field of Classification Search
CPC .. H04B 17/318; H04B 7/0408; H04B 7/0486; H04W 16/28; H04W 24/10;
(Continued)

(56) References Cited

U.S. PATENT DOCUMENTS

2016/0262077 A1* 9/2016 Zhang ............... H04W 36/0085
2017/0215117 A1* 7/2017 Kwon ................... H04W 36/32

FOREIGN PATENT DOCUMENTS

WO 2016/163786 A1 10/2016

OTHER PUBLICATIONS

International Search Report and Written Opinion dated Jan. 26, 2018 for PCT/EP2017/076260 filed on Oct. 13, 2017, 14 pages.
(Continued)

*Primary Examiner* — Phuc H Tran
(74) *Attorney, Agent, or Firm* — Xsensus LLP (57) ABSTRACT

A communications device configured to detect one or more beams of signals transmitted by each of a plurality of infrastructure equipment forming a plurality of cells of the wireless communications network, each of the beams being separately identifiable and forming a directional bias with respect to a location of the infrastructure equipment. The communications device is configured to perform measurements for evaluating a quality of the plurality of cells including one or more beams on signals received from each of the detected beams, to determine from the evaluation of each of the cells, and if one or more of the cells satisfies predetermined conditions to perform a process for identifying one or more of the cells which should be used by the communications device for transmitting data.

19 Claims, 6 Drawing Sheets

(51) Int. Cl.
| | |
|---|---|
| H04B 17/318 | (2015.01) |
| H04B 7/0408 | (2017.01) |
| H04B 7/0456 | (2017.01) |
| H04W 24/10 | (2009.01) |
| H04W 36/00 | (2009.01) |
| H04W 36/32 | (2009.01) |
| H04W 72/04 | (2009.01) |

(52) U.S. Cl.
CPC .......... *H04B 17/318* (2015.01); *H04W 24/10* (2013.01); *H04W 36/0094* (2013.01); *H04W 36/32* (2013.01); *H04W 72/046* (2013.01)

(58) Field of Classification Search
CPC ............. H04W 36/0094; H04W 36/32; H04W 72/046; A63B 2071/0625
See application file for complete search history.

(56) References Cited

OTHER PUBLICATIONS

Holma et al., "LTE for UMTS OFDMA and SC-FDMA Based Radio Access", Wiley 2009, System Architecture Based on 3GPP SAE, 11 pp. 1-11.

NTT DOCOMO, "New SID Proposal: Study on New Radio Access Technology," 3GPP TSG RAN Meeting #71, RP-160671, Mar. 2016, pp. 8.

3GPP, "3rd Generation Partnership Project; Technical Specification Group Radio Access Network; Evolved Universal Terrestrial Radio Access (E-UTRA); User Equipment (UE) procedures in idle mode", Release 13, 3GPP TS 36.304 V13.3.0, Sep. 2016, pp. 1-46.

3GPP, "3rd Generation Partnership Project; Technical Specification Group Radio Access Network; Evolved Universal Terrestrial Radio Access (E-UTRA); Radio Resource Control (RRC); Protocol specification," Release 13, 3GPP TS 36.331 V13.3.0, Sep. 2016, pp. 1-.

MediaTek Inc., "Downlink Measurements for NR Mobility," 3GPP TSG-RAN WG2 Meeting #95bis Kaohsiung, Taiwan, R2-166092, Oct. 10-14, 2016, pp. 1-4.

Huawei., "Introduction of mobility enhancement UE capabilities," 3GPP TSG-RAN2 Meeting #95bis R2-166398, Oct. 10-14, 2016, pp. 1-2.

NTT DOCOMO, "Revision of SI: Study on New Radio Access Technology," 3GPP TSG RAN Meeting #73, RP-161596, Sep. 19-22, 2016, pp. 1-7.

3GPP, "Support for Beam Based Common Control Plane", Nokia, Alcatel-Lucent Shanghai Bell, 3GPP TSG-RAN WG1#85, RAN1#85, R1-165364, May 23-27, 2016 pp. 1-5.

Ericsson, "Summary of RAN2#95bis offline discussions on NR Cell definition and relation to beams in Connected mode," 3GPP TSG-RAN WG2 #95bis, Tdoc R2-167285, Oct. 10-14, 2016, pp. 1-2.

\* cited by examiner

FIG. 1

FIG. 2 basic mobility scenarios in the NR network

FIG. 3

Consideration of multiple beams

FIG. 4

Consideration of multiple beams in measurment events

FIG. 5 use of multiple beams to modify measurement evaluation parameter.

COMMUNICATIONS DEVICE AND METHOD

This application is a continuation of U.S. application Ser. No. 16/346,134 filed Apr. 30, 2019, which is based on PCT filing PCT/EP2017/076260 filed Oct. 13, 2017 and claims priority to EP 16197339.1 filed Nov. 4, 2016, the entire contents of each are incorporated herein by reference.

BACKGROUND

Field of the Present Technique

The present disclosure relates to communications devices which are configured to select an infrastructure equipment of a wireless communications network to camp on to, to receive signals from the infrastructure equipment whilst roaming though a radio coverage area of the wireless communications network and methods for the same. The present technique also relates to communications devices which are configured to report measurements to a wireless access network of radio signals received from a plurality of infrastructure equipment of a wireless communications network so that the wireless communications network can direct the communications device to hand over or hand-off from one infrastructure equipment to another whilst the communications device is roaming though a radio coverage area of the wireless communications network and methods for the same.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Third and fourth generation mobile telecommunication systems, such as those based on the 3GPP defined UMTS and Long Term Evolution (LTE) architecture are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy third and fourth generation networks is therefore strong and the coverage area of these networks, i.e. geographic locations where access to the networks is possible, is expected to increase rapidly. However, whilst fourth generation networks can support communications at high data rate and low latencies from devices such as smart phones and tablet computers, it is expected that future wireless communications networks, will be expected to efficiently support communications with a much wider range of devices associated with a wider range of data traffic profiles, for example including reduced complexity devices, machine type communication devices, high resolution video displays and virtual reality headsets. Some of these different types of devices may be deployed in very large numbers, for example low complexity devices for supporting the "The Internet of Things", and may typically be associated with the transmissions of relatively small amounts of data with relatively high latency tolerance, whereas other types of device, for example supporting high-definition video streaming, may be associated with transmissions of relatively large amounts of data with relatively low latency tolerance.

There is therefore expected to be a desire for future wireless communications networks, which may be referred to as 5G or new radio access technology (which may be denoted new RAT or, simply, NR) networks, to support efficiently connectivity for a wide range of devices associated with different applications with different characteristic data traffic profiles, resulting in different devices have different operating characteristics and/or requirements, such as:

The introduction of new radio access technology (RAT) systems/networks therefore gives rise to new challenges. One such challenge is the need to develop effective techniques for mobility.

SUMMARY OF THE PRESENT TECHNIQUE

The present disclosure can help address or mitigate at least some of the issues discussed above. As such, embodiments of the present technique can provide a communications device, which is configured to detect one or more beams of signals transmitted by each of a plurality of infrastructure equipment forming a plurality of cells of the wireless communications network, each of the beams transmitted from each of the infrastructure equipment being separately identifiable and forming a directional bias with respect to a location of the infrastructure equipment in which the signals can be received. The communications device is configured to perform measurements for evaluating a quality of the plurality of cells consisting of one or more beams belonging to one or more of the plurality of infrastructure equipment on signals received from each of the detected beams, to determine from the evaluation of each of the cells whether one or more of the cells satisfies predetermined conditions, and if one or more of the cells satisfies the predetermined conditions to perform a process for identifying one or more of the cells which should be used by the communications device for transmitting data to or receiving data from the infrastructure equipment. The communications device is configured to determine, from the evaluation of each of the cells whether one or more of the cells satisfies predetermined conditions, by determining a number of the detected beams for receiving signals from each of the cells, and adapting one or both of the predetermined conditions or the evaluation of each of the cells in accordance with the determined number of the detected beams for receiving signals from the same cell to bias the predetermined conditions in accordance with the determined number of the detected beams. According to example embodiments therefore a communications device can be configured to consider a number of beams provided by each cell and/or a quality of the beams as part of a process for identifying the cell via which the communications device should transmit or receive data.

Embodiments of the present technique can provide an arrangement for biasing a selection of cells in accordance with a number of beams which can be detected by a communications device, so that the communications device is more likely to select infrastructure equipment with a suitable balance between the number of available beams and the quality of those beams. As such, an improvement is provided by reducing a likelihood of multiple handover or selection between different infrastructure equipment of a radio network part of a wireless communications network.

Respective aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description of example embodiments with reference to the accompanying drawings wherein like reference numerals designate identical or corresponding parts throughout the several views, and wherein.

DESCRIPTION OF EXAMPLE EMBODIMENTS

As mentioned above the embodiments of the present invention can find application with advanced wireless communications systems such as those referred to as 5G or New Radio Access Technology (NR). New Radio Access Technology has been proposed in [2] to develop a new Radio Access Technology (RAT) for the next generation wireless communication system, i.e. 5G. The new RAT is expected to operate in a large range of frequencies, from hundreds of MHz to 100 GHz and it is expected to cover a broad range of use cases. The use cases that are considered can include:
 Enhanced Mobile Broadband (eMBB)
 Massive Machine Type Communications (mMTC)
 Ultra Reliable & Low Latency Communications (URLLC)

Figure 1:
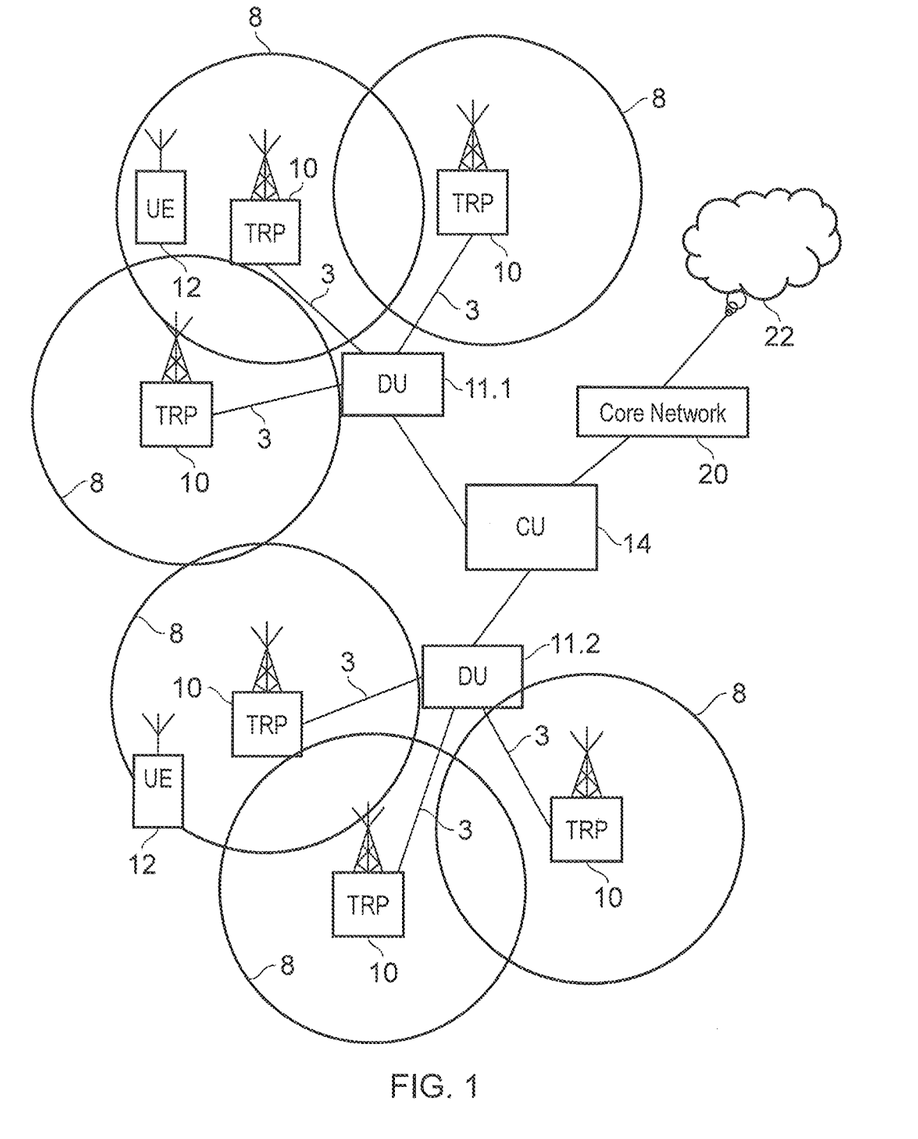
FIG. 1 is a schematic block diagram of a wireless communications system with architectural components corresponding to that of an example enhanced new radio or 5G network.

The aim of 5G is not only mobile connectivity for people, but to provide ubiquitous connectivity for any type of device and any type of application that would benefit from being connected. Many requirements and use-cases are still being discussed, but amongst those are:
 Low latency
 High data rates
 Millimetre wave spectrum use
 High density of network nodes (e.g. small cell and relay nodes)
 Large system capacity
 Large numbers of devices (e.g. MTC devices/Internet of Things devices)
 High reliability (e.g. for vehicle safety applications, such as self-driving cars).
 Low device cost and energy consumption
 Flexible spectrum usage
 Flexible mobility An example configuration of a wireless communications network which uses some of the terminology proposed for NR and 5G is shown in FIG. 1. In FIG. 1 a plurality of transmission and reception points (TRP) 10 are connected to distributed control units (DU) 11.1, 11.2 by a connection interface represented as a line 3. Each of the transmitter receiver points (TRP) 10 is arranged to transmit and receive signals via a wireless access interface within a radio frequency bandwidth available to the wireless communications network. Thus within a range for performing radio communications via the wireless access interface, each of the TRP 10, forms a cell of the wireless communications network as represented by a dashed line 8. As such wireless communications devices 12 which are within a radio communications range provided by the cells 10 can transmit and receive signals to and from the TRP 10 via the wireless access interface. Each of the distributed control units 11.1, 11.2 are connected to a co-ordinating unit (CU) 14 via an interface 16. The co-ordinating unit 14 is then connected to the a core network 20 which may contain all other functions required to transmit data for communicating to and from the wireless communications devices and the core network 20 may be connected to other networks 22.

The elements of the wireless access network shown in FIG. 1 may operate in a similar way to corresponding elements of an LTE network well-known and defined in the relevant standards administered by the 3GPP® body, and also described in many books on the subject, for example, Holma H. and Toskala A [1]. It will be appreciated that operational aspects of the telecommunications network represented in FIG. 1, and of other networks discussed herein in accordance with embodiments of the disclosure, which are not specifically described (for example in relation to specific communication protocols and physical channels for communicating between different elements) may be implemented in accordance with any known techniques, for example according to currently used approaches for implementing such operational aspects of wireless telecommunications systems, e.g. in accordance with the relevant standards.

The transceiver processors TRP 10 of FIG. 1 may in part have a corresponding functionality to a base station or eNodeB of an LTE network. Base stations, which are an example of network infrastructure equipment, may also be referred to as transceiver stations/NodeBs/eNodeBs (eNBs), and so forth. Similarly the communications devices 12 may have a functionality corresponding to devices know for operation with an LTE network and may also be referred to as mobile stations, user equipment (UE), user terminal, mobile radio, communications device, and so forth. It will be appreciated therefore that operational aspects of a new RAT network (for example in relation to specific communication protocols and physical channels for communicating between different elements) may be different to those known from LTE or other known mobile telecommunications standards. However, it will also be appreciated that each of the core network component, base stations and terminal devices of a new RAT network will be functionally similar to, respectively, the core network component, base stations and terminal devices of an LTE wireless communications network.

Embodiments of the present technique concern an aspect of new radio which is referred to as beam forming. It has been proposed that a wireless communications interface provided to a future wireless communications network may be in a millimetre wave band so that radio communications have a relatively short range. Accordingly, it is proposed to use beam forming in which radio signals are transmitted from a plurality of antennas which combine coherently in a certain direction and so a signal power within this direction is significantly higher than a signal strength in other directions. Such an arrangement is disclosed by a more detailed representation of components shown in FIG. 1 in FIG. 2.

Figure 2:
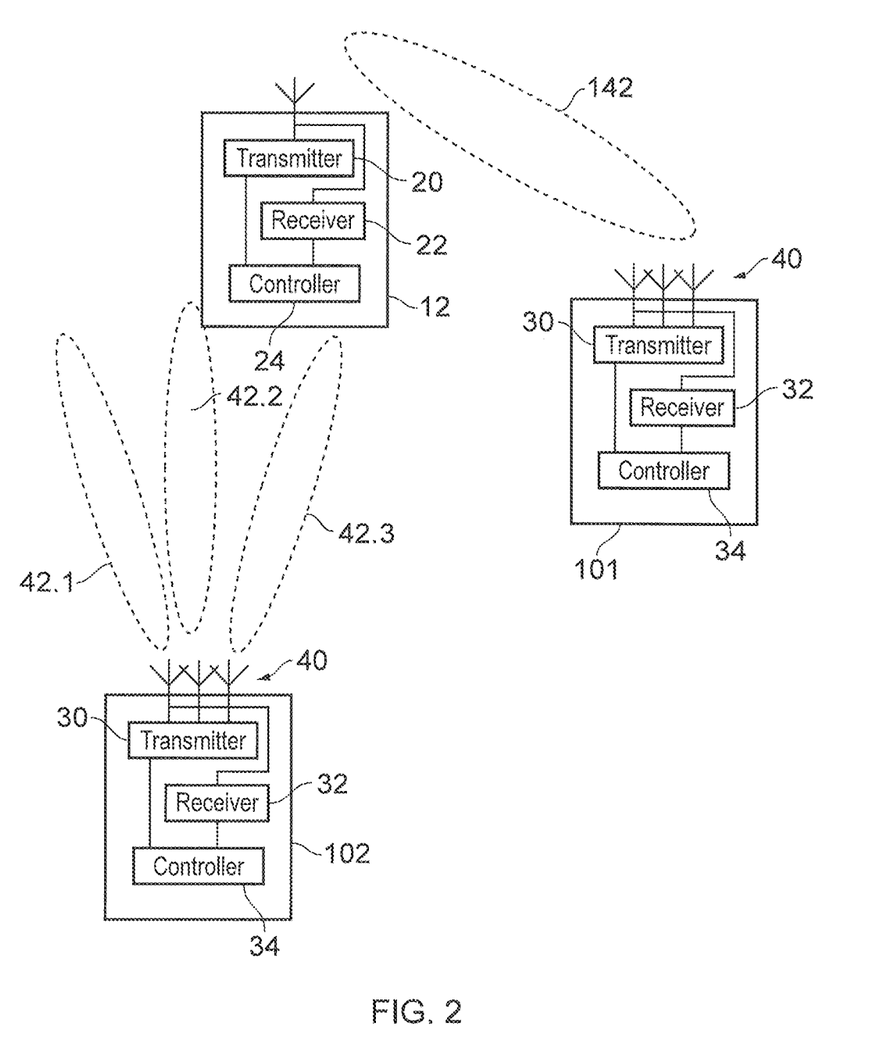
FIG. 2 is a schematic block diagram illustrating a communication device and a plurality of infrastructure equipment in which the infrastructure equipment transmit signals from different beams.

FIG. 2 provides a representation of a simplified implementation of two of the radio infrastructure equipment or TRP 101, 102 and a communications device or UE 12. As shown in FIG. 2 the communications device 12 includes a transmitter 20, a receiver 22 and a controller 24 which controls the transmitter and the receiver to transmit and receive signals representing data via the wireless access interface to the TRP 101, 102 and from the TRP 101, 102. The TRP correspondingly includes a transmitter 30, a receiver 32 and a controller 34. The transmitter 30 may include analogue and digital circuitry such as radio frequency circuits, analogue amplifiers as well as digital signalling processing software implemented as application specific semiconductor circuits, dedicated signalling processing logic and other processors. Similarly the receiver includes radio frequency circuitry signal processing software in the form of digital signal processors and other devices for detecting signals. The controller 34 is formed from control circuitry including processors executing software, application specific semiconductor circuits or hardware circuits executing digital logic. In some examples the controller can include a so-called "scheduler" which schedules the transmission of signals and the reception of signals via the wireless access interface. Similarly the transmitter 20 and the receiver 22 of the communications device may include analogue as well as digital components, radio frequency filters and transmitters as well as digital signal processing and software controlled processors. The control circuitry controls the transmitter and receiver using software control processors, application specific semiconductor devices or other digital hardware.

As shown in FIG. 2 each of the TRP 101, 102 includes a plurality of antennas 40. The antennas 40 may be used to form a multiple input, multiple output scheme. However in accordance with the present technique the signals transmitted by each of the antennas may be adapted in phase so that the signals add coherently in a particular direction with the effect that a signal strength of the radio signals transmitted in this direction is significantly higher than other directions. Accordingly the antennas in combination with a transmitter 30 can form the radio signals into a plurality of "beams" 42.1, 42.2, 42.3, 142.

Furthermore because of the nature of the transmission of radio signals within a millimetre waveband, the beams 42.1, 42.2, 42.3, 142 may be transmitted to particular communications devices 12 and each of the beams 42.1, 42.2, 42.3, 142 may be identified using some appropriate identifier. In some examples the identifier can be made using reference signals transmitted with the radio signals forming the beam 42. The identifier can additionally be associated with a timing of the transmission of the beams. The radio signals themselves may also include a cell identifier, which identifies the infrastructure equipment or TRP or group of TRPs supporting a cell which transmitted the signals. For this reason the term cell can be used interchangeably with TRP or infrastructure equipment which is operating to provide the cell. As shown in FIG. 2 one of the TRP 101, 102 can transmit a plurality of the beams 42.1, 42.2, 42.3 to the same communications device 12, which can therefore be individually identified. The beams 42.1, 42.2, 42.3 can also be transmitted in a broadcast manner, transmitting information such as synchronisation information, system information etc.

Embodiments of the present technique relate to application of a plurality of beams transmitted by infrastructure equipment such as a TRP 101, 102 to a communications device 12 and a management of mobility and selection of the most appropriate TRP 101, 102 or cell formed by the TRP 101, 102 in dependence upon a number of beams transmitted by the TRP 101, 102.

Figure 3:
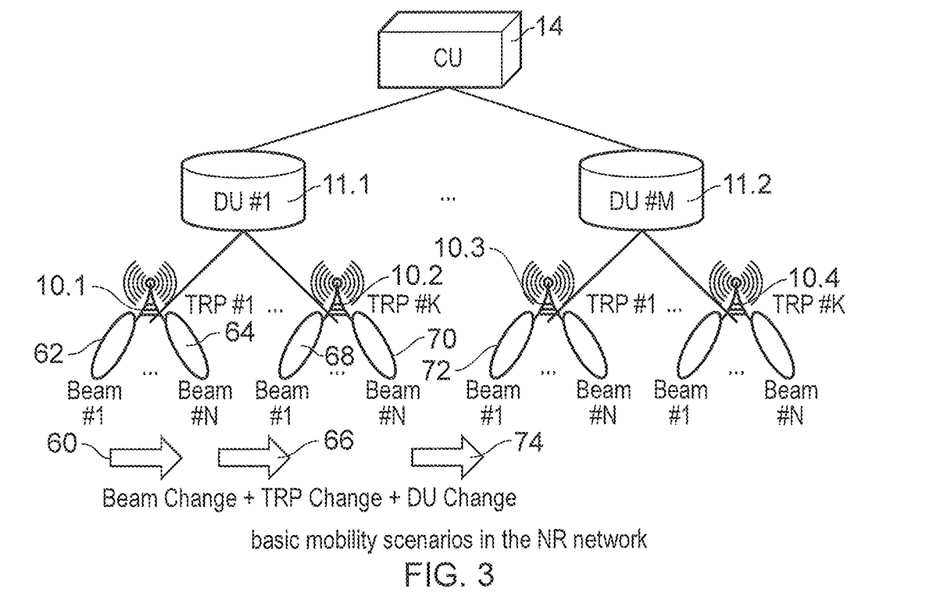
FIG. 3 is a simplified representation of the communications network showing in FIG. 1 illustrating a process of handover of a communications device as it travels throughout the wireless communications network.

FIG. 3 provides a schematic representation of the wireless communications network shown in FIG. 1 arranged to illustrate a scenario of communication with a UE 12 which is mobile. As will be appreciated if a UE 12 is transmitting from left to right and detecting the beams formed by the TRP 10.1, 10.2 the UE may be able to detect each of the beams in turn but not contemporaneously. Accordingly, the UE 12 should be arranged to hand over between different TRPs 102, 102 to transmit and/or receive signals represented as different beams as the UE travels from a left hand side of FIG. 3 to the right hand side. Thus as shown by a first arrow 60 as a UE 12 travels from an area where it can receive a first of the beams 62 to an area where it can receive a second of the beams 64, the UE 12 should hand over transmission and reception from the first beam 62 to the second beam 64. However as represented by a second arrow 66, as the UE travels further to detect a first beam 68 of a second TRP 102, then the UE should hand over from the first TRP 101 to the second TRP 102. Furthermore as the UE travels further to detect a further beam 72 transmitted by a third TRP 103, then the UE 12 should hand over from a first of the distributed units 11.1 to a second the distributed units 11.2. More details of the handover arrangement are disclosed in R2-166398 [5].

Figure 4:
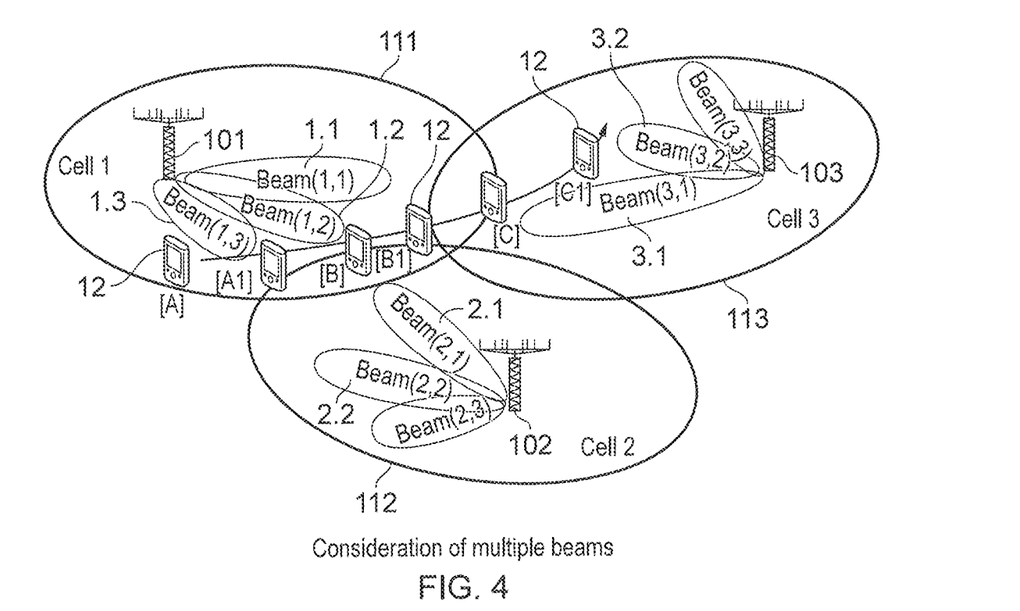
FIG. 4 is a schematic representation of a hand over of a communications device from different beams provided from different infrastructure equipment of the wireless communication network shown in FIG. 3.

In some examples each of the TRP's 10.1, 10.2, 10.3 may transmit multiple beams as shown in FIG. 2. Therefore a scenario may exist where a UE may be able to receive a different number of beams from different TRP's forming different cells. Such an arrangement is shown in FIG. 4. As shown in FIG. 4, each of the three TRPs 101, 102, 103 form three cells represented by solid lines 111, 112, 113. As shown in FIG. 4, each of the TRP's 101, 102, 103 generates three beams 1.1, 1.2, 1.3, 2.1, 2.2, 2.3, 3.1, 3.2, 3.3 transmitting signals such as beacon or broadcast signals to a UE 12, but may also be beams for receiving signals from the UE 12 if the system is operating in half duplex so that the beams can represent transmission or selection. In the scenario shown in FIG. 4, the UE 12 only connects to the strongest beam it receives. However this presents a technical problem because as the UE travels from point A to point C1, the UE may handover to different beams from different TRP's 101, 102, 103. In this case, the UE has to decide which cell has the best set of beams to serve it. Once the UE has handed over, the cell can determine the best beam (from that cell) to serve the UE. The choice of which cell is used to serve the UE is difficult because in some examples, a cell may be more desirable if it has one very good beam for example for a stationary UE. In other locations it may be better to select a cell which does not have the best single beam, but has a number of reasonably good beams. This example may be appropriate for a moving UE which is likely to need to switch between the multiple beams as the user moves through the cell.

As such the number of beams needs to be considered in the determination of cell quality, at least in some scenarios. As shown in FIG. 4, as the UE 12 travels from point A to point C1, it is served by beams from different cells and in the scenario shown the network chooses to serve the UE with the strongest beam, based on measurements performed by the UE. Therefore the network hands the UE 12 over (cell change) at point B (Cell 1 to Cell 2, Beam (1.2) to Beam (2.1)), and soon after performs another handover at point B1 (Cell 2 to Cell 1, Beam (2.1) to Beam (1.1)). This results in a "Ping-Pong" effect, meaning that a UE moves back to the original serving cell 101 after staying in the target cell 102 for a too short period. Frequent Ping-Pong is undesired in that each handover (cell-level mobility) involves radio resource control (RRC) message exchange and corresponding signalling overhead and interruption.

As an alternative, the UE could consider more beams when performing measurements, in which case the UE does NOT perform handover at point B, since its measurement shows that Cell 2 has only one strong beam (Beam (2.1)), while Cell 1 has two strong beams (Beam (1.1) and Beam (1.2)). Then at point B1, the UE performs intra-cell beam switching, which is usually considered as a simple layer-1 procedure with low overheads. As a result it will be appreciated that only considering the strongest beam might not result in the best cell change decision.

Figure 5:
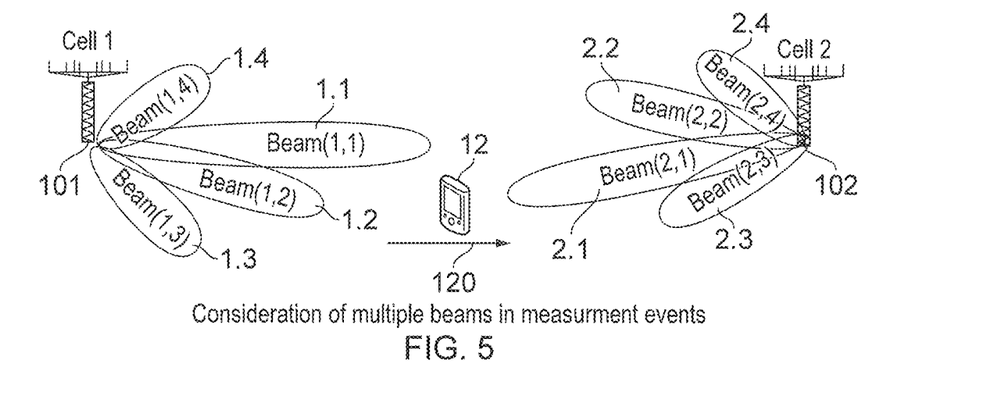
FIG. 5 is a schematic representative example illustrating a communications device being handed over from one infrastructure equipment to another each of which provides multiple beams.

It has been proposed in R2-166092 [6] to allow a UE to consider multiple beams in measurement events. As shown in FIG. 5 therefore, if a UE 12 is travelling from a left hand side to a right hand side as represented by an arrow 120 the UE may hand over from one or more of the beams 1.1, 1.2, 1.3, 1.4 of the cell 1 formed by the TRP 101 to one or more of the beams 201, 2.2, 2.3, 2.4 of cell 2 formed by the second TRP 102. However according to proposal in R2-166092 [6], the UE 12 is still considered to always select the TRP from which it can detect a strongest one of the available beams. This arrangement would not solve a problem presented above with a reference to FIG. 4 that the UE 12 would handover in a very short distance between different TRP's and potentially different distribution units thereby causing an increasing in traffic in the communications network unnecessarily.

Embodiments of the present technique provide an arrangement in which an offset or weighting factor is applied to measurements of signal strength or signal quality of beams received or detected from different TRP's. The offset value or weight is arranged to increase the likelihood of a communications device or UE selecting a TRP with a more appropriate set of beams than other TRP's so that in the case of mobility, the UE is more likely to remain on the same TRP even though it is handing over to different beams, or in the case of a stationary device, the UE remains on a TRP with a strong beam. Each beam may have its own specific offset, for example to compensate for an uplink/downlink imbalance (difference in coverage) or to compensate for the beam direction and deployment conditions (such as due to geographical features in the vicinity of the beam transmission).

Figure 6:
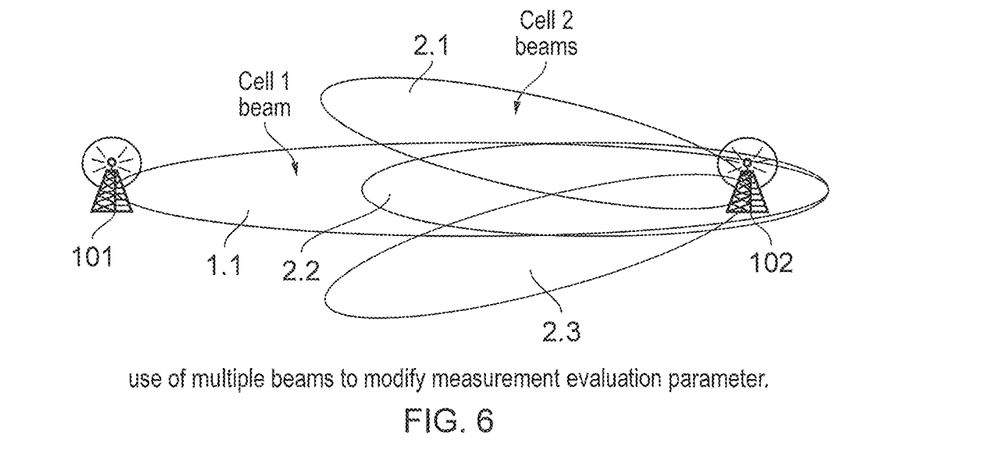
FIG. 6 is a schematic representation of a UE which is biased to select an infrastructure equipment transmitting or receiving a greater number of beams than that of another infrastructure equipment.

As shown in FIG. 6, the UE 12 may be able to receive three different beams 2.1, 2.2, 2.3 from a second cell 102 transmitted from a TRP 102, and only a single beam 1.1 transmitted by a first TRP 101. According to this arrangement therefore if a UE 12 is stationary, then it may be better for the UE to continue to receive the beam 1.1 from the first TRP 101 rather than handing over to the second TRP 102 to receive the beams 2.1, 2.2, 2.3. However if the UE 12 is mobile then there will be a variation in the signal quality from the first beam 1.1 and therefore it would be better for the UE to be biased to select the second TRP 102 and transmit or receive signals from one of the other beams, 2.1, 2.2, 2.3.

The embodiments of the present technique can find application in principle in two scenarios, one in which the UE selects a cell or infrastructure equipment providing the cell (TRP) for which it intends to transmit and to receive signals or "camp onto" and a second scenario in which the network instructs the UE to hand over from one TRP to another. The first scenario for example is conventionally associated with a situation in which the UE is in an idle or inactive mode whereas the second scenario corresponds to a conventional situation in which the UE is in a connected mode and reports measurements to the network. Each of these scenarios will be described in more detail below with reference to FIGS. 7 and 8.

UE Controlled Selection

Figure 7:
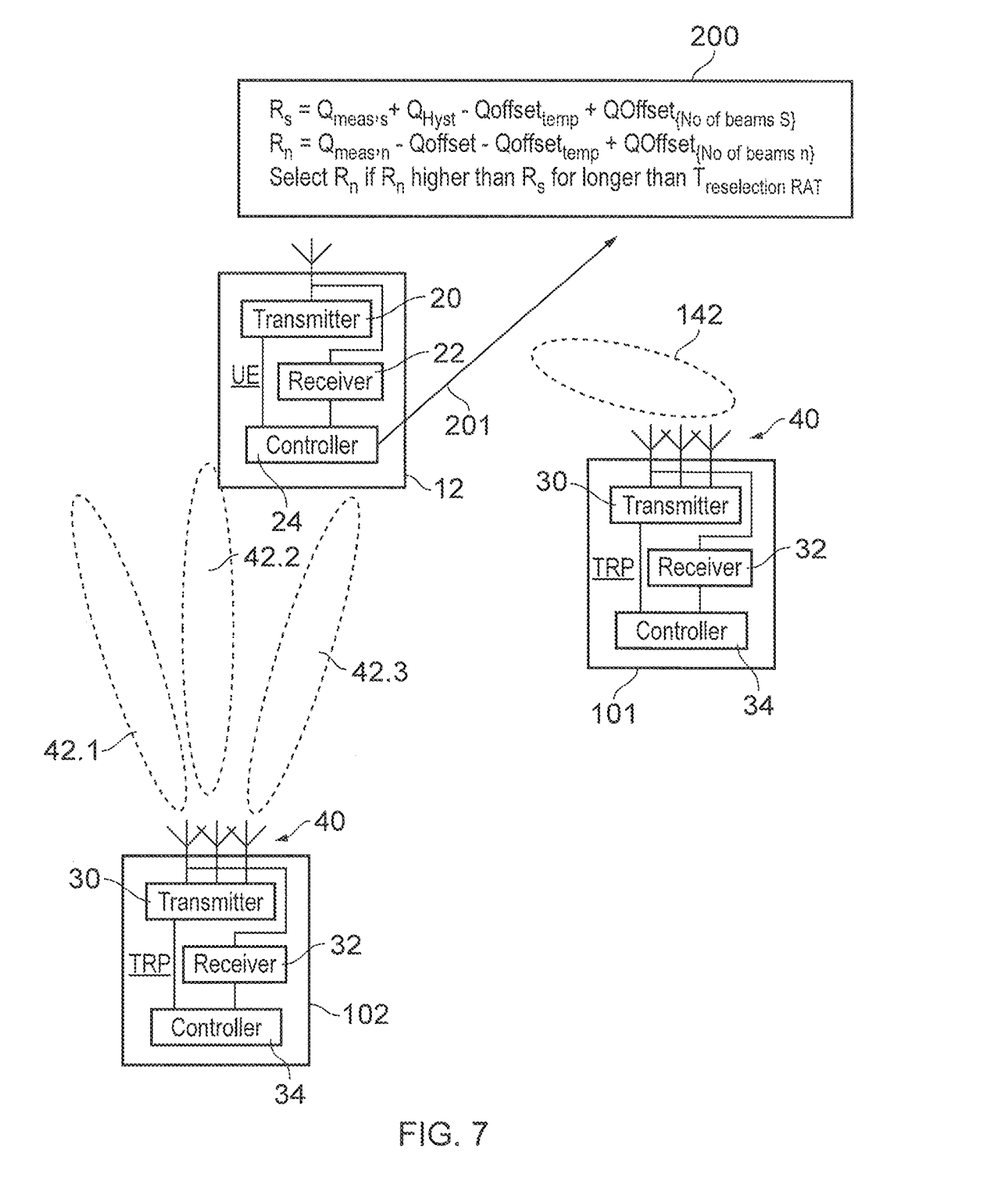
FIG. 7 is a schematic block diagram corresponding to that shown in FIG. 2 but adapted in accordance with the present technique to bias ranking of infrastructure equipment which is influenced by the number of beams which are detected.

In a first example as illustrated in FIG. 7, a UE 12 is configured to detect each of the beams transmitted by two TRP's 102, 101. Components shown in FIG. 7 correspond to those shown in FIG. 2 and so the description of these components will not be repeated. However as shown in FIG. 7 the UE 12 is able to detect three beams 42.1, 42.2, 42.3 from the second TRP 102 and a single beam 142 from the first TRP 101. According to a conventional arrangement in for example an idle mode, the UE 12 is responsible for selecting the TRP or eNodeB on which the UE should camp on to. That is to say the UE 12 wishes to receive paging messages and system information or transmit requests for connection should the UE return to a connected mode. In order to determine which of the TRP's 101, 102 the UE should camp on to, it is conventional for the UE to perform measurements of signal strength or signal quality from any of the base stations, eNodeB's or TRP's which it can detect. However according to the present technique the UE is configured to detect one or more beams transmitted by each of the plurality of TRP's 101, 102 and to rank these TRP's in accordance with a measured quality of the signal strength received from these TRP's. In the example of multiple beams, then an average of the signal strength or signal quality may be used for each of the beams. However in accordance with the present technique the controller 24 performs a ranking operation such as that shown in a box 200 which represents operations performed by the controller 24 as an arrow 201, the UE applies an offset QOffset{No of beams}, which is an offset dependent on the number of beams detected by the UE 12 from that TRP 102. As such there is a bias provided to the ranking of the TRPs because offset depends on the number of beams which the UE can detect. Accordingly, the UE is biased to select a TRP with a greater number of beams.

A conventional procedure for a UE to determine a ranking order of each of a plurality of infrastructure equipment is disclosed in TS 36.304 for a UE to select a cell on which it should camp on. The cell ranking criteria according to 3GPP TS 36.304 is as follows:

The cell-ranking criterion $R_s$ for serving cell and $R_n$ for neighbouring cells is defined by:

$$R_s = Q_{meas,s} + Q_{Hyst} - Qoffset_{temp}$$

$$R_n = Q_{meas,n} - Qoffset - Qoffset_{temp}$$

where:

| | |
|---|---|
| $Q_{meas}$ | RSRP measurement quantity used in cell reselections. |
| Qoffset | For intra-frequency: Equals to Qoffset$_{s,n}$, if Qoffset$_{s,n}$ is valid, otherwise this equals to zero. |
| | For inter-frequency: Equals to Qoffset$_{s,n}$ plus Qoffset$_{frequency}$, if Qoffset$_{s,n}$ is valid, otherwise this equals to Qoffset$_{frequency}$. |
| Qoffset$_{temp}$ | Offset temporarily applied to a cell as specified in [3] |

In all cases, the UE shall reselect the new cell, only if the following conditions are met:
 the new cell is better ranked than the serving cell during a time interval Treselection$_{RAT}$;
 more than 1 second has elapsed since the UE camped on the current serving cell.

As indicated above, the cell quality measured can be determined from an average (or weighted average or sum) of the individual beam qualities, or alternatively to be associated with the best beam on a cell. In the expression below, $Q_{meas,s}$ and $Q_{meas,s}$ are formed for the serving cell s and the other cells n from an average of the evaluated beam measurements or an average of the beam measurements that exceed a predetermined quality criterion. As indicated above and shown in FIG. 8, a biasing offset QOffset$_{\{No\ of\ beams\}}$ has been added so that the calculation becomes:

$$R_s = Q_{meas,s} + Q_{Hyst} - Qoffset_{temp} + QOffset_{\{No\ of\ beams\ S\}}$$

$$R_n = Q_{meas,n} - Qoffset - Qoffset_{temp} + QOffset_{\{No\ of\ beams\ n\}}$$

Select $R_n$ if $R_n$ higher than $R_s$ for longer than $T_{reselection\ RAT}$

According to the present technique therefore the QOffset$_{\{No\ of\ beams\ s\}}$, would therefore be adjusted according to the number of good beams such that the value ranking R would be higher for a cell with a greater number of beams.

One example of weighted averaging can be found in the UMTS specification 25.331, for calculating frequency quality using a virtual active set, the contents of which are herein incorporated by reference. The example of a weighted average provided in 25.331 is used to determine a frequency quality based on cell qualities. Accordingly, by adapting the following equations it will be appreciated a cell quality can be determined from multiple beam qualities.

$$Q_{frequencyj} =$$

$$10 \cdot \text{Log} M_{frequeincy\ j} = W_j \cdot 10 \cdot \text{Log}\left(\sum_{i=1}^{N_{Aj}} M_{ij}\right) + (1 - W_j) \cdot 10 \cdot \text{Log} M_{Best\ j},$$

$Q_{frequency\ j}$ is the estimated quality of the virtual active set on frequency j.

$M_{frequency\ j}$ is the estimated quality of the virtual active set on frequency j.

$M_{ij}$ is a measurement result of cell i in the virtual active set on frequency j.

$N_{Aj}$ is the number of cells in the virtual active set on frequency j.

$M_{Best\ j}$ is the measurement result of the cell in the virtual active set on frequency j with the highest measurement result.

$W_j$ is a parameter sent from UTRAN to UE and used for frequency j.

Accordingly, a similar calculation may be done to calculate a cell quality using individual beam qualities. Rather than estimating a frequency quality based on a number of cells in a virtual active set, we can estimate a cell quality based on a number of beams in a set.

According to some embodiments of the present technique, a UE selection of higher ranked TRP for a selection determination time is adapted in accordance with a number of detected beams for that infrastructure equipment, a UE may select a higher ranking TRP if the ranking of another TRP is higher than the TRP to which the UE is currently attached for a selection time. However to bias the UE to select the TRP with a larger number of beams, the selection time is reduced for a TRP with a number of beams which is greater than the TRP to which the UE is currently attached. By using this approach, or a combination of the above features, we can select the best cell under different situations. For example, by using a long Treselection when there is only a single (good) beam (cell 1 in FIG. 6), a moving UE will not consider this cell to be the best within a short period of time, and will select or report another cell (cell 2 in FIG. 6) which has multiple (slightly less good) beams due to a shorter time to trigger or Treselection which is set according to the number of good beams (e.g. beams above a threshold). However, if the cell with a single good beam remains the cell with the best beam for the longer Treselection, this is indicative of a relatively stable beam or slow moving UE and the UE should advantageously select this cell with the best beam even though it has fewer suitable beams overall. Suitability criteria include for example comparing a measured reference symbol received power or quality (RSRP or RSRQ) or pathloss against a minimum threshold. Additionally these may be beams within a certain range (X dB) compared to a best beam (serving or for that cell) and may be required to meet that criteria for a minimum time.

In another example, we might adjust the offset applied to cell reselection ranking—so that a cell with more good beams (cell 2 in FIG. 4) will apply a positive offset towards the overall ranking, making a cell with more beams appear relatively better, than each of its individual beams. The same approach can be used when performing connected mode event trigger evaluation, such that a cell with more beams will be reported earlier (due to meeting the event criteria earlier) and so may trigger handover earlier. Alternatively a UE observing only a single good beam will only select the cell producing that single good beam if the beam quality is good for a longer period of time (i.e. the time to trigger is longer for a single good beam than for multiple acceptable beams).

In other examples, other parameters may adapt the Idle/inactive mode Cell reselection criteria to bias the selection to infrastructure equipment with more beams, such as Offset value of each cell is adapted in accordance with the number of evaluated beams which can be detected from each cell;

The offset hysteresis value $Q_{Hyst}$ which provides a biasing offset to reduce a likelihood of selecting or reporting a different cell to the current cell once selected can be adapted in accordance with a number of beams available from the different cell;

A weighted average of a quality metric of each of the beams can be applied so that one beam with the best quality is weighted higher than beams of lower quality Absolute priority/Hierarchical Cell Structure priority values which give a priority to some cells over others can be adapted in accordance with the number of beams which can be detected from that cell.

In LTE idle mode, different frequencies have an associated priority, such that UEs will preferentially reselect to particular frequencies if a threshold or other criteria are met. By updating the priority taking into account the number of beams detected, the UE can prioritise selecting a frequency (or cell, in case of cell priorities) with the most good beams (e.g. cell 2 in FIG. 6).

A list of the measurement events (events which will trigger a report to the network) supported in LTE are presented below. Future radio systems may also adopt corresponding events and so these may be correspondingly adapted in accordance with the number of beams provided by each cell in some embodiments of the present technique as explained above. The LTE events are as follows:

Event A1 (Serving becomes better than threshold)
Event A2 (Serving becomes worse than threshold)
Event A3 (Neighbour becomes offset better than PCell/PSCell)
Event A4 (Neighbour becomes better than threshold)
Event A5 (PCell/PSCell becomes worse than threshold1 and neighbour becomes better than threshold2)
Event A6 (Neighbour becomes offset better than SCell)
Event B1 (Inter RAT neighbour becomes better than threshold)
Event B2 (PCell becomes worse than threshold1 and inter RAT neighbour becomes better than threshold2)
Event C1 (CSI-RS resource becomes better than threshold)
Event C2 (CSI-RS resource becomes offset better than reference CSI-RS resource)

More description, in particular use of the above measurement events and the parameters used in the reporting criteria which may be varied according to embodiments of the present technique can be found in 3GPP TS 36.331 section 5.5.4, the contents of which are herein incorporated by reference.

As explained, these examples can also be applied to other systems such as 5G. For all of these measurements events, a cell specific offset can be configured, as well as a time to trigger (amount of time the criteria must be met before triggering the event). The number of beams can therefore be arranged to affect a threshold, hysteresis, offset or time to trigger for the NR defined measurement events. For example, new measurement event types may be introduced, for example which compare the best beams in different cells either to an absolute threshold, or compare the best beam from a neighbour cell against the best beam of the current cell such that an event is triggered when the best beam of a neighbour cell is offset better than the best beam of the current cell. The best beam in a cell may include a larger offset, if there are more "other" good beams also detected on that cell. The time to trigger may be adjusted for this type of measurement depending on the number of good beams in a cell.

Network Controlled Selection

Figure 8:
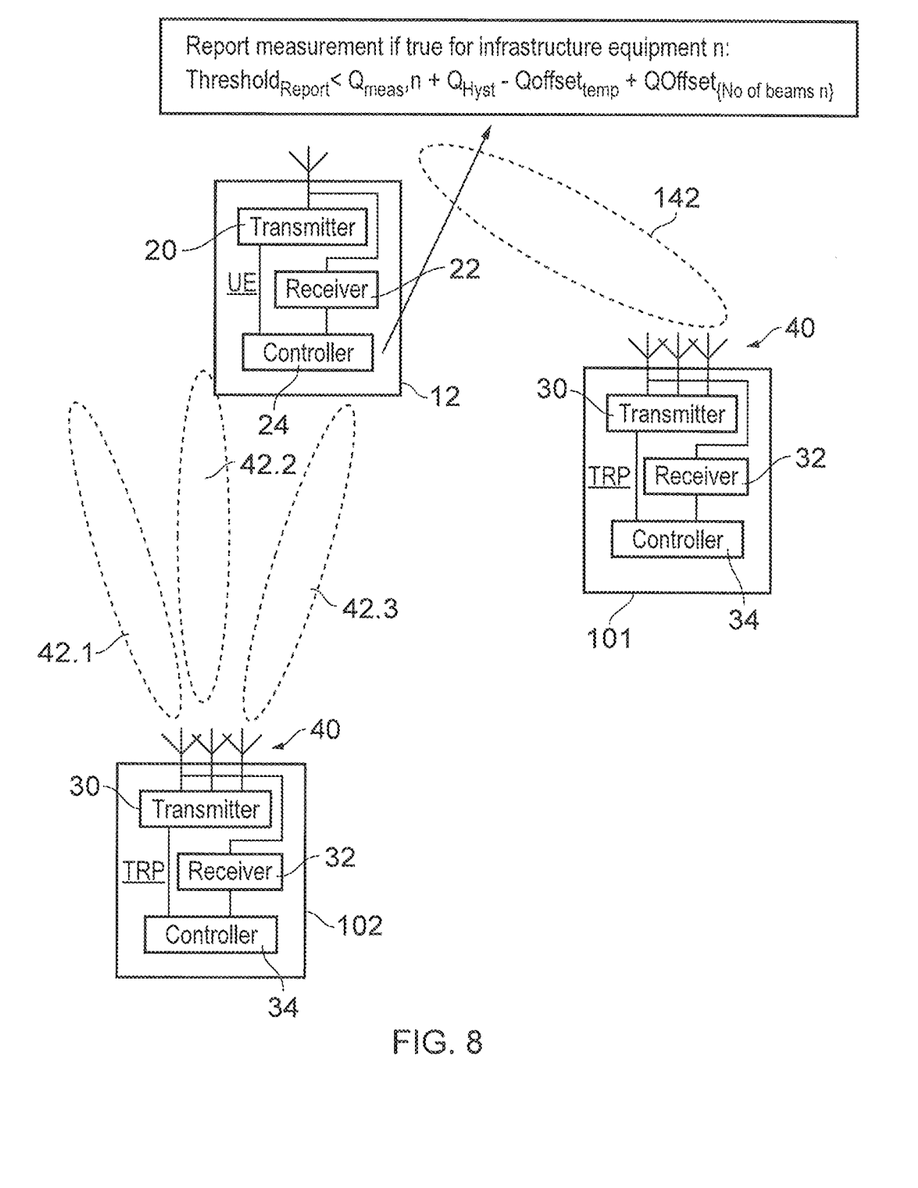
FIG. 8 is a schematic block diagram corresponding to the example showing in FIG. 2 but adapted to report measurements for different infrastructure equipment for which an offset is applied so that measurements are more likely to be reported for infrastructure equipment with a larger number of beams then those with a smaller number of beams.

FIG. 8 provides a corresponding example to that shown in FIG. 7 except for a scenario in which the network selects the TRP to which the UE 12 should hand over to. In accordance with a conventional arrangement when for example we are using a connected mode, then the UE reports measurements of signal strength from cells or base stations or TRP's 1 in the present example when these measurements satisfy predetermined criteria. The predetermined criteria or conditions are set to provide the network with information that the UE is currently able to receive signals from one of the other base stations or TRP's from the TRP to which it is currently transmitting and receiving signals. Accordingly, to reduce the transmission of measurement reports, the UE only transmits measurement reports for TRP's which it is likely to be handed over to when certain predetermined criteria are met (measurement events). FIG. 8 corresponds to the example shown in FIG. 7 and so only the differences will be explained.

As shown in FIG. 8 and as illustrated by the controller 24, the controller 24 compares the quality of signals or the signal strength with a threshold which is set to a value at which a TRP or base station will become a likely candidate for the UE to hand over to. However as shown in FIG. 8 the calculation as to whether the signal strength or signal quality exceeds the threshold is biased with an offset which has a value determined as a function of the number of beams which the UE 12 can detect. Accordingly the wireless communications network is more likely to direct the UE 12 to handover to a TRP with a larger number of beams.

According to example embodiments of the present technique therefore, the reporting of measurement to a wireless communications network can be defined as:

Report measurement if the following is true for an infrastructure equipment (TRP) n:

$$\text{Threshold}_{Report} < Q_{meas,n} + Q_{Hyst} - Q\text{offset}_{temp} + Q\text{Offset}_{\{No \text{ of beams } n\}}$$

Here a new offset factor $Q\text{Offset}_{\{No \text{ of beams } n\}}$ is provided to bias the reporting of a measurement for infrastructure equipment (TRP) which have a greater number of detected beams. Accordingly conventional conditions for reporting as defined in TS 36.331 can be adapted include a bias towards infrastructure equipment with a larger number of detected beams.

Examples of measurements for evaluating the quality metric $Q_{meas,n}$ include (as indicated above) an average of a reference symbol received power or quality (RSRP or RSRQ) for each beam averaged for all of the beams from a particular cell. Alternatively the quality metric $Q_{meas}$ can be based on a best RSRP or RSRQ of the available beams. In another example, the quality metric $Q_{meas}$ could be based on a weighted average of the quality of the RSRP or RSRQ of the signals received from each of the detected beams. According to this examples, the best beam carries the most weight, while the quality of additional beams may be added to the overall quality, with less weight.

In some embodiments a hysteresis offset which depends on one or more previously determined quality metrics for the infrastructure equipment can be adapted in accordance with the number of beams of the infrastructure equipment.

In some embodiments the quality metric of a cell may be evaluated with respect to a stability of each of the detected beams representing a number of times in a predetermined period in which the RSRP or RSRQ of the beam exceeds a predetermined threshold. For example, the measurement of stability would be a probability that the beam is available, e.g. number of times the beam is above X dBm within Y period. A mapping table can then be applied that maps the stability measurement to an offset that is further added to the list of parameters that is compared against the threshold report in the equation above. The beam stability might also be taken into account while performing measurement averaging of individual beams. In other examples the network may also take into account the current cell load, or resource overhead, or other implementation dependent factors when making the decision whether to handover based on the measurement report and these other factors.

In other examples, the UE may be requested to report additional information such as measurements indicating whether the UE is near a border area between beams of different cells. For example, if time-to-trigger is started and reset multiple times without expiring, then the UE might report this information.

In other example embodiments, the UE may determine whether a quality metric produced from the evaluation of the signals received from the one or more beams detected for each of the plurality of infrastructure equipment exceeds a predetermined threshold for a determined selection time. As for the above examples for UE controlled selection, the predetermined conditions for reporting one or more of the infrastructure equipment may be adapted by varying the determined selection time in accordance with the number of beams which can be detected from each of the plurality of infrastructure equipment.

Other Embodiments

Aspects and features which apply to both the UE selection of a cell and the network selection include examples for determining the number of beams belonging to a cell. For example, this number of beams can be determined by selecting/considering beams above a threshold measurement, for example reference signal received power (RSRP) or path loss. The threshold may be a suitability criteria (i e minimum allowed RSRP or RSRQ) with respect to a time above this minimum RSRP.

The measurement parameter (e.g. offset) may be further affected by other factors, such as the type of signal being measured. The signal being measured may be a broadcast type channel, such as a PBCH, which is being transmitted via a wide beam. However, the infrastructure equipment such as a TRP or eNodeB may have a plurality of antennas and therefore have a potential to send a very directive beam to a UE. That eNB could be given a higher offset than an eNB that does not have an ability to direct a beam of transmitted or received signals. The offset applied to bias the selection of an infrastructure equipment could also include a weight related to whether the infrastructure equipment can perform PSD boosting.

In another example, an offset may apply to cells depending on the way that those cells use their beams to provide service. For example, cell_A may require a number $N_A$ of beams to provide a given throughput or quality of service, whereas cell_B may require a smaller number $N_B$ of beams to provide that throughput or quality of service. In this case, cell_B is biased with an offset such that a UE is more likely to be handed over to cell_B than cell_A if it observes the same number of beams from cell_A and cell_B.

Various features of embodiments of the present technique are defined by the following numbered clauses.

It will be appreciated that numerous modifications and variations of the present disclosure are possible in light of the above teachings. It is therefore to be understood that within the scope of the appended claims, the disclosure may be practiced otherwise than as specifically described herein.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognize that various features of the described embodiments may be combined in any manner suitable to implement the technique.

The following numbered paragraphs provide further example aspects and features of the present technique:

Paragraph 1. A communications device for transmitting data to or receiving data from a wireless communications network, the communications device comprising
transmitter circuitry configured to transmit signals to one or more infrastructure equipment of the wireless communications network via a wireless access interface provided by the one or more infrastructure equipment,
receiver circuitry configured to receive signals from one or more of the infrastructure equipment via the wireless access interface, and
controller circuitry configured to control the transmitter circuitry and the receiver circuitry to transmit or to receive the signals representing data, the control circuitry being configured in combination with the receiver circuitry and the transmitter circuitry
to detect one or more beams of signals transmitted by each of a plurality of infrastructure equipment forming a plurality of cells of the wireless communications network, each of the beams transmitted from each of the infrastructure equipment being separately identifiable and forming a directional bias with respect to a location of the infrastructure equipment in which the signals can be received,
to perform measurements for evaluating a quality of the plurality of cells consisting of one or more beams belonging to one or more of the plurality of infrastructure equipment on signals received from each of the detected beams, to determine from the evaluation of each of the cells whether one or more of the cells satisfies predetermined conditions, and if one or more of the cells satisfies the predetermined conditions to perform a process for identifying one or more of the cells which should be used by the communications device for transmitting data to or receiving data from the infrastructure equipment, wherein the controller circuitry is configured to determine a number of the detected beams for receiving signals from each of the cells, and to adapt one or both of the predetermined conditions or the evaluation of each of the cells in accordance with the determined number of the detected beams for receiving signals from the same cell to bias the predetermined conditions in accordance with the determined number of the detected beams.

Paragraph 2. A communications device according to paragraph 1, wherein the controller circuitry is configured in combination with the receiver circuitry and the transmitter circuitry to perform the process for identifying one of the cells which should be used by the communications device for transmitting data to or receiving data from the wireless communications network by transmitting an indication of the evaluation of one or more of the cells which satisfy the predetermined conditions to the wireless communications network via a current one of the cells which is being used by the communications device for transmitting data to or receiving data from the wireless communications network, the indication being used by the wireless communications network to manage the transmission of data to or reception of the data from the wireless communications network via at least one of the current cell, a different cell or a combination of the current cell and a different cell.

Paragraph 3. A communications device according to paragraph 2, wherein the predetermined conditions include comparing a quality metric produced from the evaluation of the signals received from the one or more beams detected for each of the plurality of infrastructure equipment with a predetermined threshold for a determined trigger time, the comparison being used to compare the quality metric of the current cell with the quality metric for one or more other cells, and the adapting the predetermined conditions includes adapting the determined trigger time in accordance with the number of beams which can be detected from each of the plurality of infrastructure equipment.

Paragraph 4. A communications device according to paragraph 2 or 3, wherein the control circuitry is configured to adapt one or both of the predetermined conditions or the evaluation of each of the plurality of cells by combining one of the predetermined conditions or the evaluation of each of the plurality of cells with an offset which varies in accordance with the determined number of beams detected from the same infrastructure equipment.

Paragraph 5. A communications device according to paragraph 3 or 4, wherein the control circuitry is configured in combination with the receiver circuitry to generate the quality metric by measuring a quality of the signals or a strength of the signals received from each of the detected beams, and the quality metric for each of the plurality of cells is based on a combination or a selection of the quality of the signals or the strength of the signals received from the detected beams received from the cell.

Paragraph 6. A communications device according to paragraph 5, wherein the control circuitry is configured to generate the quality metric by forming a weighted average of the quality of the signals or the strength of the signals received from each of the detected beams.

Paragraph 7. A communications device according to paragraph 4, 5 or 6, wherein the predetermined conditions include comparing the quality metric with a predetermined quality threshold and the adapting the evaluation includes adding a hysteresis offset which depends on one or more previously determined quality metrics for the cell and the determined number of beams of the infrastructure equipment forming the cell.

Paragraph 8. A communications device according to paragraph 4, 5 or 6, wherein the quality metric is evaluated with respect to a stability of each of the detected beams representing a number of times in a predetermined period in which the signal strength or signal quality of the beam exceeds a predetermined threshold.

Paragraph 9. A communications device according to paragraph 1, wherein the controller circuitry is configured in combination with the receiver circuitry and the transmitter circuitry to perform the process for identifying one of the plurality of cells which should be used by the communications device for transmitting data to or receiving data from the infrastructure equipment by determining a relative ranking order for each of the plurality of cells for which the beams are detected in accordance with the evaluation of the received signals, and selecting one of the plurality of cells to receive data from the wireless communications network or to transmit data to the wireless communications network based on the relative ranking order.

Paragraph 10. A communications device according to paragraph 1 or 9, wherein the controller circuitry has selected a current one of the infrastructure equipment via which to transmit data to or to receive data from the wireless communications network and the predetermined conditions include whether one of the plurality of infrastructure equipment has a quality metric which is higher than a threshold for a determined selection time, and the adapting the predetermined conditions includes adapting the determined selection time in accordance with the number of beams which can be detected from each of the plurality of cells.

Paragraph 11. A communications device according to paragraph 9 or 10, wherein the control circuitry is configured to determine the process for identifying one of the plurality of infrastructure equipment which should be used by the communications device for transmitting data to or receiving data from the infrastructure equipment using a quality metric of each cell determined from the evaluation of each of the one or more detected beams of the infrastructure equipment providing the cell, and the adapting one or both of the predetermined conditions or the evaluation of each of the cells includes combining the quality metric for each cell with an offset which varies in accordance with the determined number of beams detected from the cell.

Paragraph 12. A communications device according to paragraph 11, wherein the control circuitry is configured in combination with the receiver circuitry to generate the quality metric by measuring a quality of the signals or a strength of the signals received from each of the detected beams, and the quality metric for each of the plurality of cells is based on a combination or a selection of the quality of the signals or the strength of the signals received from the detected beams received from the cell.

Paragraph 13. A communications device according to paragraph 12, wherein the control circuitry is configured to generate the quality metric by forming a weighted average of the quality of the signals or the strength of the signals received from each of the detected beams.

Paragraph 14. A communications device according to paragraph 11, 12 or 13, wherein the predetermined conditions include comparing the quality metric with a predetermined quality threshold and the adapting the evaluation includes adding a hysteresis offset which depends on one or more previously determined quality metrics for the cell and the determined number of beams of the cell.

Paragraph 15. A communications device according to any of paragraphs 9 to 14, wherein the predetermined conditions include providing a priority for each of the plurality cells, wherein the priority is based on the number of beams detected from each cell.

Paragraph 16. A communications device according to any of paragraphs 1 to 15, wherein the controller circuitry is configured in combination with the receiver circuitry to determine the number of the detected beams for receiving signals by comparing each of the beams detected from one of the cells with a predetermined threshold, and if the detected beam exceeds the predetermined threshold, counting the beam among the number of beams determined from the cell and otherwise not counting the detected beam.

Paragraph 17. A communications device according to paragraph 16, wherein the controller circuitry is configured in combination with the receiver circuitry to include a cell in the plurality of cells for evaluating whether the cell satisfies the predetermined conditions for use by the communications device for transmitting data to or receiving data if the number of beams determined from the cell exceeds a predetermined number.

Paragraph 18. A communications device according to paragraph 9, wherein the controller circuitry is configured in combination with the receiver circuitry and the transmitter circuitry to select a first of the plurality of cells to receive data from the wireless communications network or to transmit data to the wireless communications network, and to re-select subsequently a second of the plurality of cells to receive data from the wireless communications network or to transmit data to the wireless communications network based on the relative ranking order, if the second cell is ranked above the first cell for a determined selection time, and the determined selection time is varied in accordance with the number of beams which can be detected from the first of the cell and a second of the cell.

Paragraph 19. A method of transmitting data to or receiving data from a wireless communications network, the method comprising detecting one or more beams of signals transmitted by each of a plurality of infrastructure equipment forming a plurality of cells of the wireless communications network, each of the beams transmitted from each of the infrastructure equipment being separately identifiable and forming a directional bias with respect to a location of the infrastructure equipment in which the signals can be received, performing measurements for evaluating a quality of the plurality of cells consisting of one or more beams belonging to one or more of the plurality of infrastructure equipment on signals received from each of the detected beams, determining from the evaluation of each of the cells whether one or more of the cells satisfies predetermined conditions, and if one or more of the cells satisfies the predetermined conditions performing a process for identifying one or more of the cells which should be used by the communications device for transmitting data to or receiving data from the infrastructure equipment, wherein the determining from the evaluation of each of the cells whether one or more of the cells satisfies predetermined conditions determining a number of the detected beams for receiving signals from each of the cells, and adapting one or both of the predetermined conditions or the evaluation of each of the cells in accordance with the determined number of the detected beams for receiving signals from the same cell to bias the predetermined conditions in accordance with the determined number of the detected beams.

REFERENCES

[1] Holma H. and Toskala A, "LTE for UMTS OFDMA and SC-FDMA based radio access", John Wiley and Sons, 2009
[2] RP-160671, "New SID Proposal: Study on New Radio Access Technology," NTT DOCOMO, RAN #71
[3] R1-165364, "Support for Beam Based Common Control Plane", Nokia, Alcatel-Lucent Shanghai Bell, RAN1 #85
[4] R2-161596
[5] R2-166398
[6] R2-166092 Mediatek
[7] 3GPP TS 36.331
[8] 3GPP TS 36.331
[9] 3GPP TS 36.304

The invention claimed is:

1. A communications device for transmitting data to or receiving data from a wireless communications network, the communications device comprising transmitter circuitry configured to transmit signals to one or more infrastructure equipment of the wireless communications network via a wireless access interface provided by the one or more infrastructure equipment, receiver circuitry configured to receive signals from one or more of the infrastructure equipment via the wireless access interface, and controller circuitry configured to control the transmitter circuitry and the receiver circuitry to transmit or to receive the signals representing data, the control circuitry being configured in combination with the receiver circuitry and the transmitter circuitry to detect one or more beams of signals transmitted by each of a plurality of infrastructure equipment forming a plurality of cells of the wireless communications network, each of the beams transmitted from each of the infrastructure equipment being separately identifiable and forming a directional bias with respect to a location of the infrastructure equipment in which the signals can be received, to perform measurements for evaluating a quality of the plurality of cells consisting of one or more beams belonging to one or more of the plurality of infrastructure equipment on signals received from each of the detected beams, to determine from the evaluation of each of the cells whether one or more of the cells satisfies predetermined conditions, and if one or more of the cells satisfies the predetermined conditions to perform a process for identifying one or more of the cells which should be used by the communications device for transmitting data to or receiving data from the infrastructure equipment, wherein the controller circuitry is configured to determine a number of the detected beams for receiving signals from each of the cells, and to adapt one or both of the predetermined conditions or the evaluation of each of the cells in accordance with the determined number of the detected beams for receiving signals from the same cell to bias the predetermined conditions in accordance with the determined number of the detected beams.

2. The communications device as claimed in claim 1, wherein the controller circuitry is configured in combination with the receiver circuitry and the transmitter circuitry to perform the process for identifying one of the cells which should be used by the communications device for transmitting data to or receiving data from the wireless communications network by transmitting an indication of the evaluation of one or more of the cells which satisfy the predetermined conditions to the wireless communications network via a current one of the cells which is being used by the communications device for transmitting data to or receiving data from the wireless communications network, the indication being used by the wireless communications network to manage the transmission of data to or reception of the data from the wireless communications network via at least one of the current cell, a different cell or a combination of the current cell and a different cell.

3. The communications device as claimed in claim 2, wherein the predetermined conditions include comparing a quality metric produced from the evaluation of the signals received from the one or more beams detected for each of the plurality of infrastructure equipment with a predetermined threshold for a determined trigger time, the comparison being used to compare the quality metric of the current cell with the quality metric for one or more other cells, and the adapting the predetermined conditions includes adapting the determined trigger time in accordance with the number of beams which can be detected from each of the plurality of infrastructure equipment.

4. The communications device as claimed in claim 3, wherein the control circuitry is configured in combination with the receiver circuitry to generate the quality metric by measuring a quality of the signals or a strength of the signals received from each of the detected beams, and the quality metric for each of the plurality of cells is based on a combination or a selection of the quality of the signals or the strength of the signals received from the detected beams received from the cell.

5. The communications device as claimed in claim 4, wherein the control circuitry is configured to generate the quality metric by forming a weighted average of the quality of the signals or the strength of the signals received from each of the detected beams.

6. The communications device as claimed in claim 2, wherein the control circuitry is configured to adapt one or both of the predetermined conditions or the evaluation of each of the plurality of cells by combining one of the predetermined conditions or the evaluation of each of the plurality of cells with an offset which varies in accordance with the determined number of beams detected from the same infrastructure equipment.

7. The communications device as claimed in claim 6, wherein the predetermined conditions include comparing the quality metric with a predetermined quality threshold and the adapting the evaluation includes adding a hysteresis offset which depends on one or more previously determined quality metrics for the cell and the determined number of beams of the infrastructure equipment forming the cell.

8. The communications device as claimed in claim 6, wherein the quality metric is evaluated with respect to a stability of each of the detected beams representing a number of times in a predetermined period in which the signal strength or signal quality of the beam exceeds a predetermined threshold.

9. The communications device as claimed in claim 1, wherein the controller circuitry is configured in combination with the receiver circuitry and the transmitter circuitry to perform the process for identifying one of the plurality of cells which should be used by the communications device for transmitting data to or receiving data from the infrastructure equipment by determining a relative ranking order for each of the plurality of cells for which the beams are detected in accordance with the evaluation of the received signals, and selecting one of the plurality of cells to receive data from the wireless communications network or to transmit data to the wireless communications network based on the relative ranking order.

10. The communications device as claimed in claim 9, wherein the control circuitry is configured to determine the process for identifying one of the plurality of infrastructure equipment which should be used by the communications device for transmitting data to or receiving data from the infrastructure equipment using a quality metric of each cell determined from the evaluation of each of the one or more detected beams of the infrastructure equipment providing the cell, and the adapting one or both of the predetermined conditions or the evaluation of each of the cells includes combining the quality metric for each cell with an offset which varies in accordance with the determined number of beams detected from the cell.

11. The communications device as claimed in claim 10, wherein the control circuitry is configured in combination with the receiver circuitry to generate the quality metric by measuring a quality of the signals or a strength of the signals received from each of the detected beams, and the quality metric for each of the plurality of cells is based on a combination or a selection of the quality of the signals or the strength of the signals received from the detected beams received from the cell.

12. The communications device as claimed in claim 11, wherein the control circuitry is configured to generate the quality metric by forming a weighted average of the quality of the signals or the strength of the signals received from each of the detected beams.

13. The communications device as claimed in claim 10, wherein the predetermined conditions include comparing the quality metric with a predetermined quality threshold and the adapting the evaluation includes adding a hysteresis offset which depends on one or more previously determined quality metrics for the cell and the determined number of beams of the cell.

14. The communications device as claimed in claim 9, wherein the predetermined conditions include providing a priority for each of the plurality cells, wherein the priority is based on the number of beams detected from each cell.

15. The communications device as claimed in claim 9, wherein the controller circuitry is configured in combination with the receiver circuitry and the transmitter circuitry to select a first of the plurality of cells to receive data from the wireless communications network or to transmit data to the wireless communications network, and to re-select subsequently a second of the plurality of cells to receive data from the wireless communications network or to transmit data to the wireless communications network based on the relative ranking order, if the second cell is ranked above the first cell for a determined selection time, and the determined selection time is varied in accordance with the number of beams which can be detected from the first of the cell and a second of the cell.

16. The communications device as claimed in claim 1, wherein the controller circuitry has selected a current one of the infrastructure equipment via which to transmit data to or to receive data from the wireless communications network and the predetermined conditions include whether one of the plurality of infrastructure equipment has a quality metric, which is higher than a threshold for a determined selection time, and the adapting the predetermined conditions includes adapting the determined selection time in accordance with the number of beams which can be detected from each of the plurality of cells.

17. The communications device as claimed in claim 1, wherein the controller circuitry is configured in combination with the receiver circuitry to determine the number of the detected beams for receiving signals by comparing each of the beams detected from one of the cells with a predetermined threshold, and if the detected beam exceeds the predetermined threshold, counting the beam among the number of beams determined from the cell and otherwise not counting the detected beam.

18. The communications device as claimed in claim 17, wherein the controller circuitry is configured in combination with the receiver circuitry to include a cell in the plurality of cells for evaluating whether the cell satisfies the predetermined conditions for use by the communications device for transmitting data to or receiving data if the number of beams determined from the cell exceeds a predetermined number.

19. A method of transmitting data to or receiving data from a wireless communications network, the method comprising detecting one or more beams of signals transmitted by each of a plurality of infrastructure equipment forming a plurality of cells of the wireless communications network, each of the beams transmitted from each of the infrastructure equipment being separately identifiable and forming a directional bias with respect to a location of the infrastructure equipment in which the signals can be received, performing measurements for evaluating a quality of the plurality of cells consisting of one or more beams belonging to one or more of the plurality of infrastructure equipment on signals received from each of the detected beams, determining from the evaluation of each of the cells whether one or more of the cells satisfies predetermined conditions, and if one or more of the cells satisfies the predetermined conditions performing a process for identifying one or more of the cells which should be used by the communications device for transmitting data to or receiving data from the infrastructure equipment, wherein the determining from the evaluation of each of the cells whether one or more of the cells satisfies predetermined conditions determining a number of the detected beams for receiving signals from each of the cells, and adapting one or both of the predetermined conditions or the evaluation of each of the cells in accordance with the determined number of the detected beams for receiving signals from the same cell to bias the predetermined conditions in accordance with the determined number of the detected beams.

* * * * *